May 7, 1929.  C. CURTI  1,712,137

BOOK PAGE INDICATOR AND RETAINER

Filed April 30, 1928

INVENTOR.
Carmine Curti
BY
ATTORNEY

Patented May 7, 1929.

1,712,137

UNITED STATES PATENT OFFICE.

CARMINE CURTI, OF NEW YORK, N. Y.

BOOK-PAGE INDICATOR AND RETAINER.

Application filed April 30, 1928. Serial No. 274,148.

This invention relates to a new and useful appliance in the nature of a book page indicator and retaining device especially adapted to be removably attached to a book as a means of holding the pages of a book in an extended position when the book is open, eliminating the necessity of manually holding the pages. The said device is also adapted to serve as a book page indicator, or book mark when the book is in a closed position.

The object of the invention is to provide a device of the class described of novel construction and arrangement of parts hereinafter more fully described, claimed and illustrated in the accompanying drawing.

Fig. 10 is a vertical fragmentary sectional view taken on the line 10—10 of Fig. 9.

Figure 1:
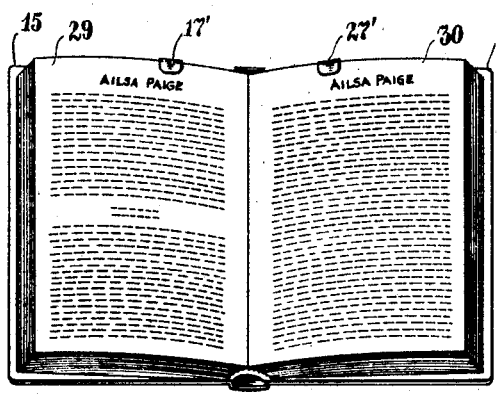
Fig. 1 is a perspective view of a book showing my improved device, attached thereto, as same would appear when in use.
Figure 2:
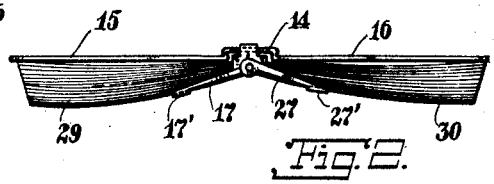
Fig. 2 is a top plan view thereof.
Figure 3:
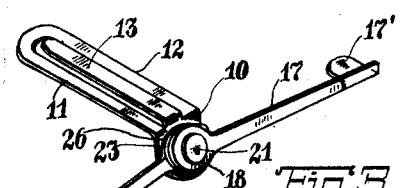
Fig. 3 is an enlarged perspective view of my improved device.
Figure 4:
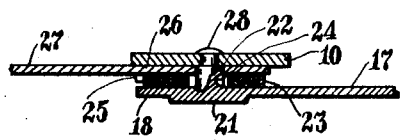
Fig. 4 is a central sectional view thereof illustrating in particular the method of attaching the retaining arms and connected mechanism to the bracket.

As here embodied my improved book page indicator and retaining device comprises a bracket 10 provided with a pair of side extended elements 11 and 12, formed or bent at approximately a right angle to the main portion of the bracket 10. The bracket 10 is also provided with a center extended element 13, formed or bent similarly to the above mentioned elements 11 and 12 and positioned intermediate thereof, somewhat above the elements 11 and 12.

The above described construction is such as will permit the side extended elements of the bracket to slidably engage inside the upper portion of the binding 14, of a book intermediate the covers 15 and 16 of the said book, the center extended element of the bracket slidably engaging outside the said upper portion of the binding, as a means of removably holding my improved device in place on the binding of a book.

The retaining arm 17 is provided with an enlarged extremity 18 and is integral with the flanged element 21 and stud 22. The helical spring 23 may be partially covered by flange 18 and is co-axially positioned on the stud 22 and is secured at its inner extremity as at 24 to the stud 22 and is secured at its outer extremity as at 25, to the enlarged extremity 26 of the arm 27. The enlarged extremity 26 of the arm 27 has formed therein an aperture adapted to receive the stud 22, as a means of pivotally mounting the arm 27 thereon. The stud 22 rotatively engages in an aperture formed in the main portion of the bracket 10 and is secured thereto, as at 28, preferably by riveting over the extremity of the stud 22. The above mentioned arms 17 and 27 are provided with enlarged free extremities 17′ and 27′, respectively, formed or bent at approximately right angles to the main portions of the arms. The above described construction is such as will permit the spring 23 to urge the arms in an opposite direction so as to permit the enlarged free extremities of the arms to engage any desired opposite adjacent pages 29 and 30, of an open book, for the purpose of securely holding the desired pages in a fully extended position, rendering the reading or perusal of the said desired pages easier and without the necessity of manual assistance. It is obvious that the above described construction is also such as will permit the book to be closed, when my improved device is in place therein, for the purpose of providing a book mark or page indicator enabling the reader to readily find the desired page.

Figure 5:
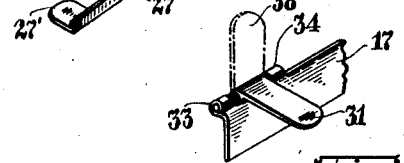
Fig. 5 is a fragmentary perspective view illustrating a modification of my improved device.
Figure 6:
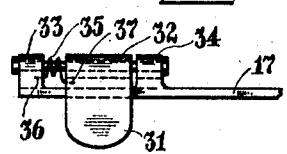
Fig. 6 is a top plan view thereof.

In Figs. 5 and 6, I have shown side extended members 31, pivotally mounted at one end thereof on the pins 32 carried in the lug elements 33 and 34, of the arms 17 and 27, positioned at the free extremities thereof, at the rear of the said arms. The coil springs 35 are co-axial on the pins 32 and are provided with extended extremities 36 and 37 adapted to engage the lugs 33 and the extended members 31. The above described construction is such as will normally hold the extended members in engagement with the above mentioned desired opposite adjacent pages of an open book for the purpose as above set forth, and which will permit the extended members to be pivoted or hinged upwardly as at 38, as a means of facilitating the turning of the pages of the book as is advantageous in the reading or perusal of the book.

Figure 7:
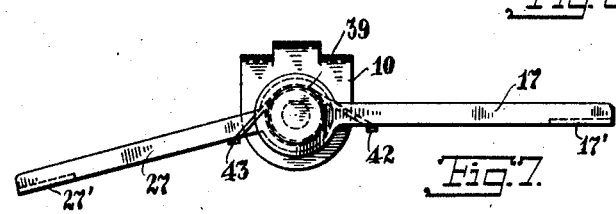
Fig. 7 is a top plan view illustrating another form of my improved device.
Figure 9:
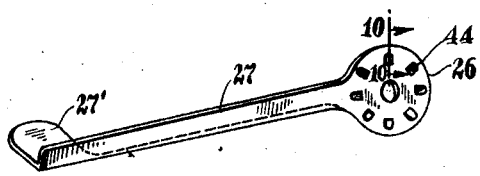
Fig. 9 is a perspective detail view illustrating a still further form of one of the retaining arms as embodied in my improved device.
Figure 8:
Fig. 8 is a detail top plan view of the spring as embodied therein.
Figure 11:
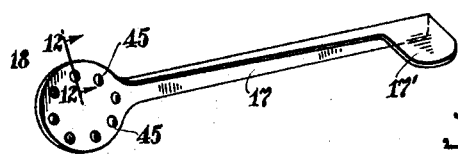
Fig. 11 is a similar perspective detail view of the other arm as embodied therein.
Figure 12:
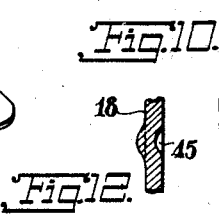
Fig. 12 is a vertical sectional view taken on the line 12—12 of Fig. 11.

In Figs. 7 and 8, I have shown a coil spring 39 co-axial on the above mentioned stud 22, intermediate the enlarged extremities 18 and 26 of the arms 17 and 27. The spring 39 is provided with oppositely extended elements 40 and 41, having their extremities formed or bent as at 42 and 43, respectively adapted to engage the arms 17 and 27, respectively. The above described construction is such as will permit the spring 39 to urge the arms in an opposite direction, for the purpose as above set forth.

In Figs. 9, 10, 11 and 12, I have shown the enlarged extremity 26 of the arm 27 having formed or bent therefrom a plurality of radial inwardly extended prong elements 44, adapted to frictionally engage in suitable indentures 45 formed in the enlarged extremity 18 of the arm 17. The above described construction is such as will permit the engagement of the elements 44 and 45 to hold the arms 17 and 27 in any desired oppositely extended position, for the purpose as above set forth.

Figure 13:
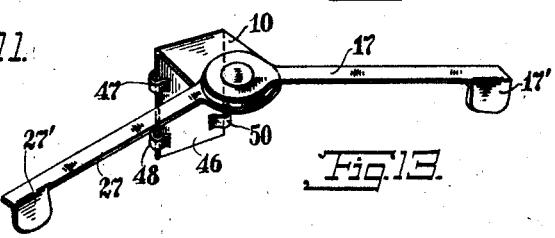
Fig. 13 is a perspective view illustrating a further modification of my improved device.

In Fig. 13, I have shown the bracket 10 provided with an extended portion 46 formed or bent downwardly therefrom, at approximately a right angle to the main portion of the said bracket. The extended portion 46 of the bracket 10 is provided with clip elements 47, 48 and 49, 50, extended respectively from the opposite sides thereof, and adapted to removably engage the edges of the binding 12 of a book, for the purpose as above set forth.

Figure 14:
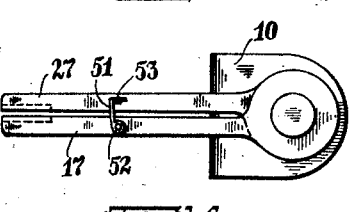
Fig. 14 is a front elevational view illustrating a further development of my improved device.

In Fig. 14, I have shown a lever 51, or catch pivotally secured at one extremity thereof, as at 52, intermediately to the arm 17, and adapted to engage the lug element 53 of the arm 27. The latter described construction is such as will permit my improved device to be held in a closed position.

Having thus described my invention, what I claim as new and desire to secure by United States Letters Patent is:

1. In a device of the class described, a bracket provided with extended elements adapted to engage the upper portion of the binding of a book as a means of removably holding the device in place on the said book, a pair of arms each pivotally attached to the said bracket, a spring adapted to urge the said arms in opposite directions, said arms provided with enlarged free extremities adapted to engage two opposite adjacent pages of an open book as a means of holding the said pages in an extended position.

2. A device of the class described comprising a bracket provided with extended elements adapted to engage the upper portion of the binding of a book as a means of removably holding the device in place on the said book, a pair of arms each pivotally attached to the said bracket, a spring adapted to urge the said arms in opposite directions, said arms provided with enlarged free extremities adapted to engage two opposite adjacent pages of an open book as a means of holding the said pages in an extended position.

3. In a device of the class described, a pair of arms each pivotally mounted on a stud secured to a bracket, a spring co-axial on the said stud, said spring provided with extended elements having extremities adapted to engage the said pair of arms, as a means of holding the enlarged extremities of the said arms in engagement with any desired opposite adjacent pages of an open book for the purpose of holding the said pages in an extended position.

4. A device of the class described, comprising a bracket for engagement upon the binding of a book, a pair of arms each pivotally attached on the bracket, a means for urging the said arms in opposite directions, and the said arms being provided with enlarged free extremities for engaging two opposite adjacent pages of an open book as a means for holding the said pages in an extended position.

In testimony whereof I have affixed my signature.

CARMINE CURTI.